(12) United States Patent
Hsia et al.

(10) Patent No.: US 12,057,673 B2
(45) Date of Patent: Aug. 6, 2024

(54) ALL-FIBER LASER OSCILLATORS ADOPTING SIDE-PUMP SIGNAL-AND-PUMP COMBINERS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 201 days.

(21) Appl. No.: 17/892,906

(22) Filed: Aug. 22, 2022

(65) Prior Publication Data

US 2023/0231354 A1 Jul. 20, 2023

Related U.S. Application Data

(63) Continuation-in-part of application No. 17/576,890, filed on Jan. 14, 2022, now Pat. No. 11,592,620.

(51) Int. Cl.
| | |
|---|---|
| *H01S 3/067* | (2006.01) |
| *G02B 6/28* | (2006.01) |
| *H01S 3/094* | (2006.01) |
| *H01S 3/0941* | (2006.01) |
| *H01S 3/16* | (2006.01) |
| *H01S 3/23* | (2006.01) |

(52) U.S. Cl.
CPC ........ *H01S 3/06733* (2013.01); *G02B 6/2835* (2013.01); *H01S 3/06716* (2013.01); *H01S 3/06737* (2013.01); *H01S 3/0675* (2013.01); *H01S 3/094019* (2013.01); *H01S 3/094053* (2013.01); *H01S 3/0941* (2013.01); *H01S 3/1618* (2013.01); *H01S 3/2308* (2013.01)

(58) Field of Classification Search
CPC ................................... G02B 6/2835
See application file for complete search history.

(56) References Cited

U.S. PATENT DOCUMENTS

| | | | |
|---|---|---|---|
| 5,999,673 A | 12/1999 | Valentin et al. | |
| 11,448,825 B2 * | 9/2022 | Zheng | G02B 6/245 |

(Continued)

FOREIGN PATENT DOCUMENTS

| | | | | |
|---|---|---|---|---|
| CN | 209626641 U | * | 11/2019 | ............. H01S 3/067 |

*Primary Examiner* — Daniel Petkovsek
(74) *Attorney, Agent, or Firm* — Han IP PLLC; Andy M. Han (57) ABSTRACT

An all-fiber laser oscillator comprises a laser cavity, an amplification fiber, a plurality of diode lasers, and at least one side-pump signal-and-pump combiner (combiner). The combiner comprises a double-clad fiber (DCF) and four or more multimode fibers (MMFs). DCF comprises a first taper portion, whereas each of MMFs comprises a second taper portion fused around DCF. MMFs are configured to carry a portion of combined optical energy (COE) and to couple to DCF. The first taper portion can partially compensate a beam divergence created by the second taper portion, thereby increasing a coupling efficiency of COE coupled from MMFs to DCF with improved thermal performance. In a coupling portion, a refractive index difference between MMFs and DCF is configured to form a backward coupling barrier to suppress an optical energy in DCF from coupling into MMFs, thereby protecting the plurality of diode lasers from damage.

10 Claims, 5 Drawing Sheets

(56) References Cited

U.S. PATENT DOCUMENTS

| | | | |
|---|---|---|---|
| 11,592,620 B1* | 2/2023 | Hsia | G02B 6/2835 |
| 2006/0133731 A1 | 6/2006 | Sintov | |
| 2010/0183261 A1 | 7/2010 | Gonthier et al. | |
| 2012/0206793 A1* | 8/2012 | Tanaka | G02B 6/2804 |
| | | | 359/341.3 |
| 2023/0178955 A1* | 6/2023 | Goodno | H01S 3/0623 |
| | | | 372/6 |

* cited by examiner

ALL-FIBER LASER OSCILLATORS ADOPTING SIDE-PUMP SIGNAL-AND-PUMP COMBINERS

CROSS-REFERENCE TO RELATED APPLICATIONS

The present disclosure is part of a continuation-in-part (CIP) application of U.S. patent application Ser. No. 17/576,890, filed 14 Jan. 2022 and issued as U.S. Pat. No. 11,592,620 on 28 Feb. 2023, the content of which being incorporated by reference in its entirety.

TECHNICAL FIELD

The present disclosure relates to all-fiber laser oscillators adopting side-pump signal-and-pump combiners in high power fiber laser applications and more particularly to the side-pump signal-and-pump combiners that can effectively suppress stimulated Raman scattering (SRS) and prevent back reflected power from launching into pump laser diodes and damaging thereof with improved thermal performance and reliability.

BACKGROUND

High power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of an optical fiber type and are connected using fusion splices without air interfaces between any two of the optical components in connection. The optical components comprise multiple diode laser pumps with multiple optical fiber pigtails, a rare-earth-doped optical fiber with two fiber Bragg gratings, a delivery fiber spliced to the rare-earth-doped optical fiber for a fiber laser output, and a signal-and-pump combiner with multiple input multimode fibers to splice to the multiple optical fiber pigtails of the multiple diode laser pumps and with a length of double-clad fiber (DCF) to splice to the rare-earth-doped optical fiber for a pump input. The rare-earth-doped optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The rare-earth-doped optical fiber with the gain medium receives and absorbs optical energy from the multiple diode laser pumps through the signal-and-pump combiner and creates a coherent laser light via a resonator built by using the two fiber Bragg gratings at two ends of the rare-earth-doped optical fiber. Such multimode fiber lasers in the 2- to 6-kW regime are ideal for cutting and welding, and particularly in an area of materials processing and laser machining as a reliable replacement for bulky diode pumped solid-state lasers and $CO_2$ lasers. It has been shown that lengthening the rare-earth-doped optical fiber can inherently increase power of the fiber lasers without a limit if a large mode area of DCF is used. However, DCFs used in both the length of DCF of the signal-and-pump combiner and the rare-earth-doped optical fiber are surrounded by polymer coatings with a limited tolerance to heat. In other words, the maximum thermal load provided by the polymer coatings dictates the maximum output power that the fiber laser can attain.

Not similar to optical fibers used in optical communications, where the coatings outside the optical fibers simply play a role of mechanical protection, the polymer coatings used in DCFs, however, perform mechanical and optical functions. DCFs use dual acrylate coatings, with a first low refractive index polymer coating in contact with the glass, and with a durable second coating to protect the first relatively soft low refractive index coating. In other words, the second coating mechanically protects the low refractive index coating from mechanical chips, cuts, or scratches which may result in optical energy to leak out from the optical fiber, possibly creating localized hot spots or catastrophic burns at high pump powers. DCFs with the dual acrylate coating can pass the stringent reliability test specified by Telcodia GR-20 standard used in the telecom industry.

An N×1 tapered fiber bundle (TFB) is used to combine multiple ("N") inputs from multimode fiber pigtails connecting to multiple pump diodes into a single output, so called an end-pump combiner. The "N" satisfies the brightness conservation theorem, and the maximum "N" is 6, 13, 17, 24, 53, 63, 136, etc., depending on various combinations of various diameter and numerical aperture (NA) of the input optical fibers (i.e., the multiple multimode fibers) and the output optical fiber. In practice, the N is chosen to be far smaller than the maximum numbers specified above to provide some margin. The N×1 TFB is typically fabricated in a process similar to fused fiber couplers by bundling in parallel N multimode optical fibers that have been stripped of their polymer coatings. The N multimode optical fibers are then fused and tapered by heating with a flame such as electric arc, oxyhydrogen flame, or a $CO_2$ laser beam. A fused and tapered section is then cleaved in the middle and spliced to a single output fiber. The use of N×1 TFB to combine multiple laser diode pumps into one fiber is essential for pumping the fiber lasers. For a 7×1 TFB, each of seven input optical fibers with 200-μm diameter and 0.22-NA receives, for example, 200 W from each diode laser pump. Seven such laser pumps are combined into a single 400-μm double-clad fiber with 0.46-NA. This configuration gives a pumping module composed of active and passive components, delivering 1.4 kWs power for a fiber laser, based on the commercially available 200-W laser diode pumps. For more examples, with a Yb-doped fiber of 400-μm and 0.46-NA, a common TFB coupling six 200 μm 0.22-NA pump delivery fibers each with a pump power of 500 W provides a total power greater than 3 kWs. Using a 19×1 TFB and greater than 100-W pump power delivered in each 105-μm input optical fiber, a total of about 2-kW pump power can be achieved.

TFB can also be used in optical fiber amplifiers to combine pump and signal light that is confined to the core of a double-clad fiber. In this case, the fiber in the center of the tapered fiber bundle is replaced by the double-clad fiber with the core carrying an amplifier seed. This is commonly referred to as an (N+1)×1 combiner, which is critical for the optical fiber amplifiers or fiber lasers. As an example, a (6+1)×1 combiner accommodating six pump fibers and the double-clad fiber as a signal fiber can be used for a 1 kW co-pumped optical fiber amplifier, based on six pump diodes each delivering, for example, 250 W of pump power for a total pump power of 1.5 kWs. No matter whether 7×1 or (6+1)×1, the signal-and-pump combiner needs to be thermally managed to maintain its reliability. Specifically, the residual pump power, amplified spontaneous emission (ASE) power, and unwanted signal power trapped in an outer cladding of the double-clad fiber in the fiber lasers or the optical fiber amplifiers need to be removed to avoid potential damages to components downstream. The residual pump power can be in hundreds of watts in kW fiber lasers and the ASE can be in the range of many watts, typically much higher in the optical fiber amplifiers. The unwanted energy launching into the outer cladding of the double-clad fiber creates localized hot spots or catastrophic burns at high pump powers. The most efficient way to remove the cladding light is to strip the low-index fluoroacrylic coating off a length of the fiber and re-coat it with a high-index coating so that high-NA cladding light can be stripped.

A conventional signal-and-pump combiner is based on an end-pump technology and is basically an (N+1)×1 TFB pump combiner. The (N+1)×1 TFB pump combiner is a hexagonally packed fiber bundle fused and tapered for stability and high packing density. The resulting cross section of the hexagonally stacked bundle is close to a circle, and thus eases splicing with the output optical fiber. However, in making TFB, the signal fiber in a central position is tapered, twisted, and fused with "N" pump fibers. The signal fiber is significantly affected, resulting in an optical loss and beam quality degradation for a signal light. A splicing loss may be high due to a mode-field-diameter mismatch between the TFB and a rare-earth-doped double-clad fiber in applications of the optical fiber lasers and the optical fiber amplifiers.

With the emergence and development of double-clad fibers, large mode area fibers, semiconductor lasers as pumping sources, and cascade-pumping technologies, an output power of the fiber lasers continues to increase. The pumping sources and the resonant cavity with a gain medium are used through fiber fusion-splice processes. The all-fiber structure makes the system more compact and stable with a higher coupling efficiency and better reliability. A high coupling efficiency of an optical fiber signal-and-pump combiner is essential to build the fiber lasers with a high power level because a power carrying capability of such fiber lasers directly relates to the high coupling efficiency, which further determines an output power level of such fiber lasers. Such an optical fiber signal-and-pump combiner adopts a side-pump technology and uses a circumferential side of the double-clad fibers for one or more pump lights with a pump power to launch and couple into an inner cladding of the double-clad fibers without occupying two ends of the double-clad fibers, therefore, not affecting an input and an output of the signal light and its transmission. The main advantage of this technology is that the signal fiber in a central position is not tapered, which can greatly reduce the loss of the signal light, improve the coupling efficiency ensuring good performance, and maintain beam quality to potentially achieve a scheme, arrangement or configuration of multi-point cascade-pumping. Also, not like TFB based on the end-pump technology, the optical fiber signal-and-pump combiner based on the side-pump technology does not need cleaving in the middle of the TFB and splicing to another single output fiber. Furthermore, the double-clad fibers used in the optical fiber signal-and-pump combiner match most of rare-earth-doped double-clad fibers in NA and core and cladding diameters without a mode-field-diameter mismatch. Such features cannot be achieved using the end-pump technology of TFB mentioned above.

A side-pump based optical fiber signal-and-pump combiner with high reliability and good stability is of great significance for constructing fiber laser systems with a high power and a high beam quality because it can support "N" laser pumps launching into the (N+1)×1 optical fiber signal-and-pump combiner with all the signal and the pump power outputted from the one signal fiber to achieve a high output power. In reported all-fiber structures, the side-pump based signal-and-pump combiner is made by a fiber tapering and fusion method in which the tapered pumping fiber is directly fused with the inner cladding of the signal fiber, so called a side coupler, achieving higher pumping coupling efficiency and a power carrying capability of kilowatts of pumping power. Therefore, this technology has become a mainstream for making high-power side-pump based optical fiber signal-and-pump combiners. However, the conventional side-pump technology adopted to build such high-power side-pump signal-and-pump combiners needs the multi-point cascaded-pumping configuration, which introduces an accumulated splice loss and thus does not meet requirements. A reason of using the multi-point cascaded-pumping configuration is that parallel pumping using multiple channels of the signal-and-pump combiner is not commercially available due to production difficulties. Either coupling efficiency is not as high as expected or the overall insertion loss is not low enough, resulting in a low production yield. It is, therefore, the purpose of this patent application to disclose all-fiber laser oscillators comprising at least one side-pump signal-and-pump combiner in a forward-pump, a backward-pump, or a bidirectional-pump configuration. The at least one side-pump signal-and-pump combiner is built to effectively reduce a beam divergence of the pump light outputted to the DCF and a heat accumulation in so called localized hot spots in the polymer coatings of the DCF, and to increase a backward pump isolation and a backward signal isolation while maintaining beam quality of an outputted fiber laser light.

SUMMARY

An all-fiber laser oscillator comprises a laser cavity comprising a high-reflector fiber-Bragg grating (HR FBG) and a low-reflectivity output coupler FBG (OC FBG). The all-fiber laser oscillator further comprises an amplification optical fiber comprising a first length of double-clad fiber doped with Ytterbium (Yb). The first length of double-clad fiber is configured to couple between the HR FBG and the OC FBG and to produce a fiber laser light via the laser cavity. The all-fiber laser oscillator further comprises a plurality of diode lasers each comprising a laser source and a section of pump feeding fiber and configured to provide a portion of a combined optical energy for pumping the amplification optical fiber. The all-fiber laser oscillator further comprises at least one side-pump signal-and-pump combiner coupled with either or both of the HR FBG and the OC FBG. A forward-pump, a backward-pump, or a bidirectional-pump scheme, arrangement or configuration may be adopted to provide a high pump power and to avoid excess heat at the at least one side-pump signal-and-pump combiner. The all-fiber laser oscillator further comprises an endcap configured to output the fiber laser light via a delivery fiber to a workpiece at a focal point. The all-fiber laser oscillator may further comprise a cladding power stripper configured to remove any residual power trapped in a cladding of the delivery fiber and to maintain beam quality of the fiber laser light.

The at least one side-pump signal-and-pump combiner (hereinafter, the side-pump signal and pump combiner, unless otherwise specified) comprises a second length of double-clad fiber and a plurality of multimode fibers. The second length of double-clad fiber comprises a first core, a first cladding with a first diameter, a second cladding, and an outer polymer coating over the second cladding. The second length of double-clad fiber is configured to transmit an optical signal in the first core and bounded in a first interface between the first core and the first cladding, whereas the optical signal propagates in a forward direction from an input to an output of the second length of double-clad fiber. The second length of double-clad fiber further comprises a cladding-stripped portion with the second cladding stripped, whereas the cladding-stripped portion comprises a first portion in proximity to the input, a first taper portion, and a coupling portion connecting between the first portion and the first taper portion. The first taper portion comprises cross sections with their diameters progressively reduced from the first diameter to a predetermined diameter in a backward direction.

Each of the plurality of multimode fibers comprises a second core, a third cladding, outer claddings and buffer coatings over the third cladding, and a second portion with the outer claddings and buffer coatings stripped. A part of the second portion is configured to be heated and stretched into a second taper portion with a first predetermined taper slope with respect to an optical axis of each of the plurality of multimode fibers. A plurality of second taper portions in the plurality of multimode fibers are configured to be fused around the coupling portion, whereas the plurality of multimode fibers are configured to carry a portion of a combined optical energy and to couple thereof to the second length of double-clad fiber, continuing to be guided in the first cladding and bounded in a second interface between the first cladding and the air in the first taper portion. The portion of the combined optical energy comes from the plurality of diode lasers.

The portion of the combined optical energy is coupled into the plurality of multimode fibers each at an incident angle against the optical axis of an associated multimode fiber less than a first maximum acceptance angle determined by a first NA of each of the plurality of multimode fibers. The portion of the combined optical energy incident slightly less than the first maximum acceptance angle is reflected in the second taper portion with a divergence angle against the optical axis of the associated multimode fiber larger than the incident angle with higher-order modes generated. The higher-order modes lead to larger divergence. On the other hand, the first taper portion in the length of double-clad fiber is configured to reduce the larger divergence of the higher-order modes, thereby preserving some of the higher-order modes bounded in the second length of double-clad fiber and increasing a coupling efficiency of the portion of the combined optical energy coupled from the plurality of multimode fibers to the second length of double-clad fiber.

The second length of double-clad fiber further comprises a third portion comprising an intermediate section with the second cladding stripped and an output section, whereas the third portion is configured to connect the intermediate section to the first taper portion and to output both the optical signal and the combined optical energy coupled. The third portion can be spliced with the rare-earth-doped double-clad fiber in applications of optical fiber lasers and optical fiber amplifiers taking advantage of mode field diameter matches. The portion of the combined optical energy coupled is guided in the first cladding and bounded by a third interface between the first cladding and the second cladding in the output section. The first taper portion comprises a second predetermined taper slope configured to partially compensate the larger divergence of the higher-order modes in the second taper portion and to minimize numbers of the higher-order modes to launch in the third portion and to leak from the third interface, thus reducing an energy loss and a number of localized hot spots, and further increasing power carrying capability and reliability of the side-pump signal and pump combiner. The coupling portion comprises a power transfer region configured to allow the combined optical energy to transfer power from the plurality of multimode fibers to the second length of double-clad fiber, whereas the first taper portion progressively reduces a diameter thereof toward the predetermined diameter to form a waist in proximity to the power transfer region, the second taper portions progressively reduces a diameter thereof toward one end to form a second taper end. The waist and the plurality of second taper ends in the plurality of multimode fibers are fused together to form a waist portion in the power transfer region with a cross-sectional diameter smaller than the first diameter.

The plurality of second taper portions in the plurality of multimode fibers are configured to be fused around the coupling portion with the third cladding directly coupled with the first cladding. The first cladding comprises a second refractive index is configured to be larger than the first refractive index, thereby forming a backward coupling barrier to suppress an optical energy in the second length of double-clad fiber from coupling into the plurality of multimode fibers. In this case, the optical energy comprising the part of the combined optical energy, a part of the input optical signal, and a part of a reflected fiber laser light, when propagating in the coupling portion, is continuously bounded in a third interface between the first cladding and the third cladding, thereby being suppressed from coupling into both the plurality of multimode fibers and the plurality of the section of pump feeding fibers, thereby improving a backward pump isolation and a backward signal isolation of the side-pump signal-and-pump combiner.

The cladding-stripped portion is installed in a central position surrounded by the plurality of second taper portions before the plurality of second taper portions are further heated, stretched, and rotated all together in multiple processes. Each of multiple processes comprises a heated temperature range, heated positions, fiber pulling tensions of the plurality of second taper portions, a rotation angle increment, and correction measures if the fiber pulling tensions do not reach predetermined ones. The plurality of second taper portions are interlaced with each other and wrapped around the coupling portion with an inclined angle subtended between an optical axis of the length of double-clad fiber and the optical axis of each of the plurality of multimode fibers after the multiple processes are carried out. The third portion of the length of double-clad fiber is exerted with little stress during the multiple processes, thereby preserving an acceptable degradation and an acceptable insertion loss and beam quality of the fiber laser light in the second length of double-clad fiber.

The multiple processes further comprise a torch scanning process configured to control the fiber pulling tensions at the heated positions in the coupling portion and to regulate the rotation angle increment. The plurality of second taper portions interlaced are further heated, stretched, and finally fused and embedded in the coupling portion, thereby enhancing the coupling efficiency of the combined optical energy, introducing little strain to the second length of double-clad fiber, and further preserving the acceptable insertion loss of the optical signal and beam quality of the fiber laser light into the second length of double-clad fiber. The plurality of second taper portions fused and embedded in the coupling portion are further heated to remove an unwanted output part of each of the plurality of second taper portions. The plurality of second taper portions with the unwanted output part removed are further heated to liquefy material in each break region caused when the unwanted output part of each of the plurality of second taper portions is removed. Each break region becomes a rounded surface converged toward the second length of double-clad fiber, thereby further improving the coupling efficiency of the combined optical energy coupled from the plurality of multimode fibers into the second length of double-clad fiber. The multiple processes further comprise a first heat treatment process configured to heat and stretch the coupling portion to form the first taper portion. The multiple processes further comprise a second heat treatment process configured to heat and stretch the plurality of second taper portions that are accordingly fused and embedded to an embedded depth, further reducing the larger divergence of the higher-order modes introduced in the plurality of second taper portions and thereby further improving the coupling efficiency of the combined optical energy coupled from the plurality of multimode fibers into the second length of double-clad fiber. The multiple processes further comprise a third heat treatment process with a double-clad fiber pulling, whereas the double-clad fiber pulling in the coupling portion is configured to lessen a micro-deformation in the first core caused in the multiple processes before the third heat treatment process, thereby further preserving an acceptable degradation, an acceptable insertion loss, and beam quality of the fiber laser light at the output of the second length of double-clad fiber. The multiple processes further comprise a fourth heat treatment process configured to control the embedded depth in the coupling portion and to modify launching conditions of the combined optical energy coupled to the second length of double-clad fiber, thereby further reducing the larger divergence of the higher-order modes and improving coupling efficiency of the combined optical energy coupled from the plurality of multimode fibers to the second length of double-clad fiber. The multiple processes further comprise optical monitoring processes configured to observe and check the optical signal and the combined optical energy at the output of the second length of double-clad fiber. Note that the micro-deformation is a microscopic fiber deformation commonly caused by a micro-bending due to a poor fiber cable design or external perturbations on an optical fiber, such as in a fiber fusion tapering process. In this case, light rays which would propagate in the optical fiber are lost in its cladding.

In contrast to all the reported side-pump structures, the first taper portion is adopted with associated multiple processes in making the side-pump signal and pump combiner. Experimental results show that a (6+1)×1 side-pump signal-and-pump combiner based on the structure of the side-pump signal-and-pump combiner according to the present disclosure can achieve an output beam divergence improvement of 10%, a coupling efficiency of 98%, and a beam quality ($M^2$ factor of 1.3) for the fiber laser light with a high production yield while maintaining an insertion loss of 0.1 dB. Due to such output beam divergence improvement, a thermal performance is improved by at least 60%, thus enhancing reliability and power carrying capability of the (6+1)×1 side-pump signal-and-pump combiner. Due to the high backward pump isolation and the backward signal isolation of the side-pump signal-and-pump combiner, any of the forward-pump, the backward-pump, and the bidirectional-pump scheme, arrangement or configuration is feasible in high power laser applications and to avoid excess heat at the side-pump signal-and-pump combiner.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "first", a "second", a "third", and so forth does not necessarily represent a part that is mentioned in an ordinal manner, but a particular one.

DETAILED DESCRIPTION OF VARIOUS EMBODIMENTS

Reference will now be made in detail to the preferred embodiments of the disclosure. Wherever possible, same or similar reference numerals are used in the drawings and the description to refer to the same or like parts or steps. The drawings are in their simplest form and are not to scale.

Figure 1:
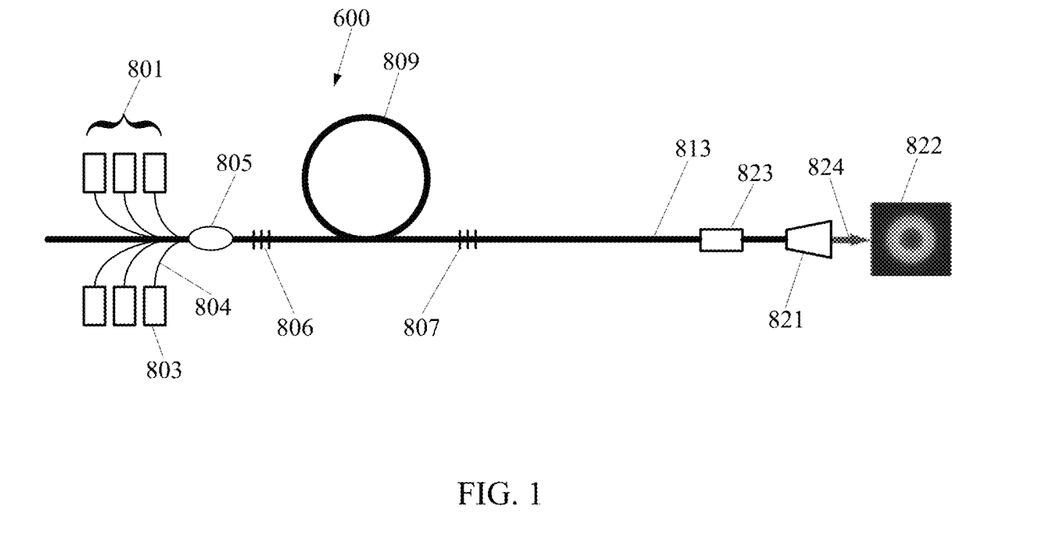
FIG. 1 is a first configuration of an all-fiber laser oscillator according to the present disclosure.

FIG. 1 is a first configuration of an all-fiber laser oscillator according to the present disclosure. In FIG. 1, the all-fiber laser oscillator 600 comprises a laser cavity comprising a high-reflector (HR) fiber-Bragg grating (HR FBG) 806 and a low-reflectivity output coupler (OC) FBG (OC FBG) 807. The all-fiber laser oscillator 600 further comprises an amplification optical fiber comprising a first length of double-clad fiber 809 doped with Ytterbium (Yb). The first length of double-clad fiber 809 is configured to couple between the HR FBG 806 and the OC FBG 807 and to produce a fiber laser light via the laser cavity. The all-fiber laser oscillator 600 further comprises a plurality of diode lasers 801 each comprising a laser source and a section of pump feeding fiber and configured to provide a portion of a combined optical energy for pumping the first length of double-clad fiber 809 doped with Yb. For example, a diode laser comprises the laser source 803 and the section of pump feeding fiber 804. The all-fiber laser oscillator 600 further comprises at least one side-pump signal-and-pump combiner 805 coupled with the HR FBG 806. A forward-pump or co-pump scheme, arrangement or configuration is adopted to provide a high pump power and to avoid excess heat at the at least one side-pump signal-and-pump combiner 805. The all-fiber laser oscillator 600 further comprises an endcap 821 configured to output the fiber laser light 824 via a delivery fiber 813 to a workpiece at a focal point where a beam profile 822 is displayed. The all-fiber laser oscillator 600 may further comprise a cladding power stripper 823 configured to remove any residual power trapped in a cladding of the delivery fiber 813 and to maintain beam quality of the fiber laser light 824.

As depicted in FIG. 1, the at least one side-pump signal-and-pump combiner 805 is used to provide a forward-pump for the all-fiber laser oscillator 600 but to avoid excess heat generated at the at least one side-pump signal-and-pump combiner 805 due to a high pump power application. A high power single-mode fiber laser is highly required in material processing because it can provide a near-diffraction-limited beam quality. However, when a core diameter of double-clad fibers used, such as the amplification optical fiber and the delivery fiber 813, becomes smaller, a nonlinear effect such as SRS in the double-clad fibers becomes significant especially in a long length, in which some of power of the fiber laser light 824 is transferred to a Stokes light, resulting in power instability of the fiber laser light 824. Backward SRS can also be generated by the reflected light from the cladding power stripper 823, the endcap 821, or the workpiece in the all-fiber laser oscillator 600. A conventional pump combiner is made by the TFB based on an end-pump technology mentioned earlier, in which tapering of the fiber bundle increases NA of the pump fibers and changes a mode field diameter (MFD) of a signal fiber. When the TFB is spliced with an output double-clad fiber, a special attention is needed for optical matching and alignment. Any slight mismatch or misalignment may result in a degradation of the beam quality with an increasing signal insertion loss. For a backward-propagating optical signal, an optical signal insertion loss of 0.4 dB may cause damage to each pump laser diode due to an insufficient isolation against the reflected fiber laser light. A more promising approach to overcoming these problems is adopting the side-pump technology according to the present disclosure, which involves coupling the pump light via the outermost cladding surface into the double-clad fibers. The key advantage of this technology is the uninterrupted signal core, eliminating the need for an additional caution in a fusion splice for mode-field matching. As will be depicted later in FIGS. 5~8 that a backward coupling barrier in the at least one side-pump signal-and-pump combiner 805 is configured to prevent a first part of the fiber laser light reflected from the workpiece and trapped in the second length of double-clad fiber from coupling back into the four or more multimode fibers of the at least one side-pump signal-and-pump combiner 805, thereby protecting the plurality of diode lasers 801 from damage.

Figure 2:
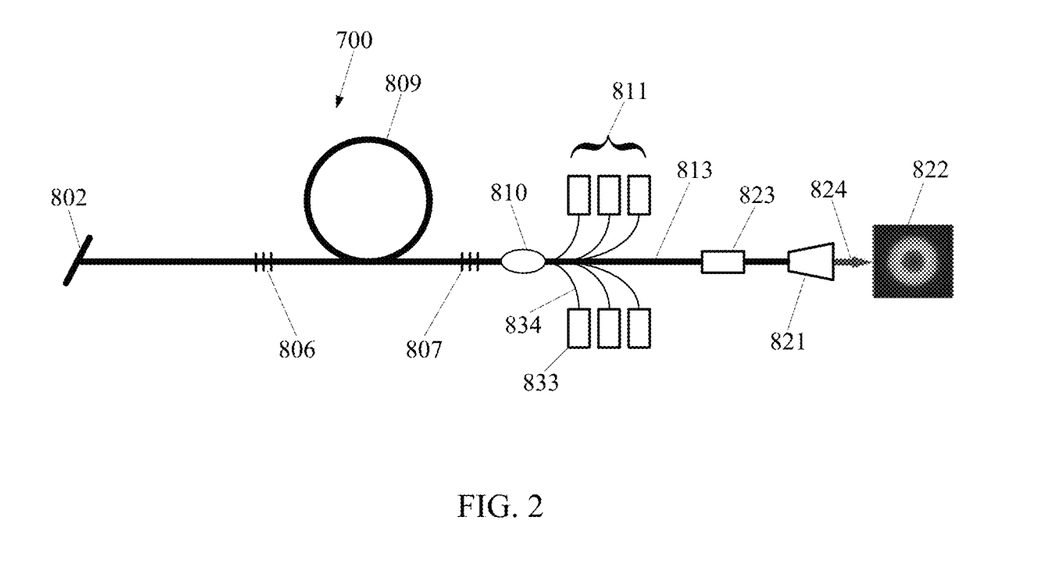
FIG. 2 is a second configuration of an all-fiber laser oscillator according to the present disclosure.

FIG. 2 is a second configuration of an all-fiber laser oscillator according to the present disclosure. In FIG. 2, an all-fiber laser oscillator 700 comprises the laser cavity comprising the HR FBG 806 and the OC FBG 807. The all-fiber laser oscillator 700 further comprises the amplification optical fiber comprising the first length of double-clad fiber 809 doped with Yb. The first length of double-clad fiber 809 doped with Yb is configured to couple between the HR FBG 806 and the OC FBG 807 and to produce a fiber laser light via the laser cavity. The all-fiber laser oscillator 700 further comprises a plurality of diode lasers 811 each comprising a laser source and a section of pump feeding fiber and configured to provide a portion of a combined optical energy for pumping the first length of double-clad fiber 809 doped with Yb. For example, a diode laser comprises a laser source 833 and a section of pump feeding fiber 834. The all-fiber laser oscillator 700 further comprises at least one side-pump signal-and-pump combiner 810 coupled with the OC FBG 807. A backward-pump or counter-pump scheme, arrangement or configuration is adopted to provide a high pump power and to avoid excess heat at the at least one side-pump signal-and-pump combiner 810. The all-fiber laser oscillator 700 further comprises the endcap 821 configured to output the fiber laser light 824 via the delivery fiber 813 to a workpiece at the focal point where the beam profile 822 is displayed. The all-fiber laser oscillator 700 may further comprise the cladding power stripper 823 configured to remove any residual power trapped in the cladding of the delivery fiber 813 and to maintain beam quality of the fiber laser light 824. The all-fiber laser oscillator 700 may further comprise an angle-cleaved facet 802 to avoid an end reflection. As depicted in FIG. 2, the at least one side-pump signal-and-pump combiner 810 is used to provide a backward-pump for the all-fiber laser oscillator 700 but to avoid excess heat generated due to a high pump power application. As will be depicted later in FIGS. 5~8 that a backward coupling barrier in the at least one side-pump signal-and-pump combiner 810 is configured to prevent a second part of the fiber laser light reflected from the workpiece and trapped in the second length of double-clad fiber from coupling back into the four or more multimode fibers of the at least one side-pump signal-and-pump combiner 810, thereby protecting the second set of the plurality of diode lasers 811 from damage.

Figure 3:
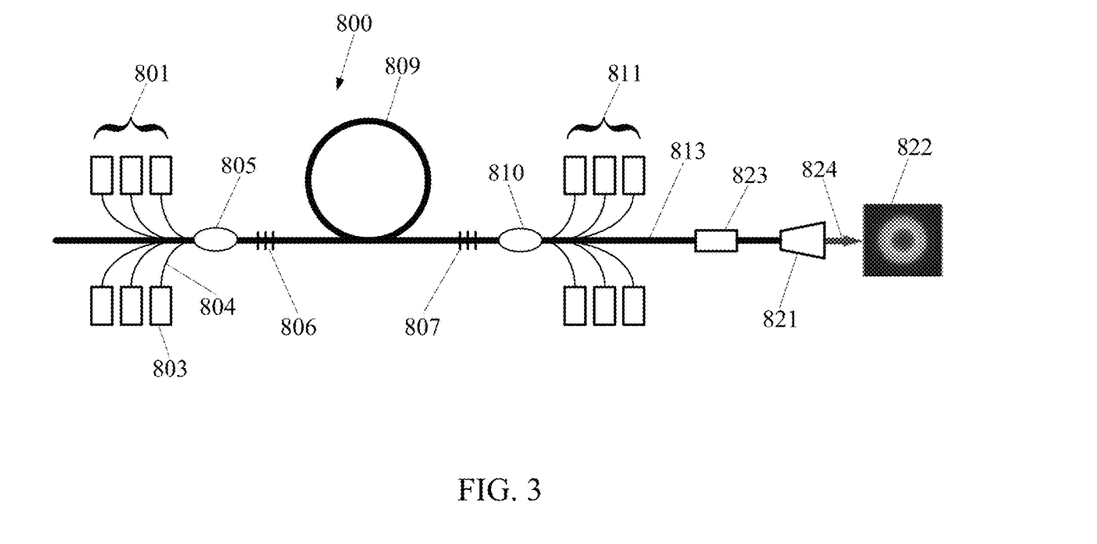
FIG. 3 is a third configuration of an all-fiber laser oscillator according to the present disclosure.

FIG. 3 is a third configuration of an all-fiber laser oscillator according to the present disclosure. In FIG. 3, an all-fiber laser oscillator 800 comprises a laser cavity comprising the HR FBG 806 and the OC FBG 807. The all-fiber laser oscillator 800 further comprises the amplification optical fiber comprising the first length of double-clad fiber 809 doped with Yb. The first length of double-clad fiber 809 doped with Yb is configured to couple between the HR FBG 806 and the OC FBG 807 and to produce the fiber laser light via the laser cavity. The all-fiber laser oscillator 800 further comprises a first set of a plurality of diode lasers 801 and a second set of a plurality of diode lasers 811. Each set is configured to provide a portion of a combined optical energy for pumping the amplification optical fiber. Each diode laser comprises a laser source and a section of pump feeding fiber. For example, the diode laser comprises the laser source 803 and the section of pump feeding fiber 804. The all-fiber laser oscillator 800 further comprises a first side-pump signal-and-pump combiner 805 and a second side-pump signal-and-pump combiner 810 respectively coupled with the HR FBG 806 and the OC FBG 807. A bidirectional-pump scheme, arrangement or configuration is adopted to provide a high pump power and to avoid excess heat at either the first side-pump signal-and-pump combiner 805 or the second side-pump signal-and-pump combiner 810. The all-fiber laser oscillator 800 further comprises the endcap 821 configured to output the fiber laser light 824 via the delivery fiber 813 to the workpiece at the focal point where the beam profile 822 is displayed. The all-fiber laser oscillator 800 may further comprise the cladding power stripper 823 configured to remove any residual power trapped in the cladding of the delivery fiber 813 and to maintain beam quality of the fiber laser light 824.

As depicted in FIG. 3, the first side-pump signal-and-pump combiner 805 and a second side-pump signal-and-pump combiner 810 are used to provide the bidirectional-pump for the all-fiber laser oscillator 800 but to avoid excess heat generated at either the first side-pump signal-and-pump combiner 805 or the second side-pump signal-and-pump combiner 810 due to a high pump power application. As mentioned, a high power single-mode fiber laser is highly required in material processing because it can provide a near-diffraction-limited beam quality. However, the nonlinear effect such as SRS in the double-clad fibers may occur especially in a long length, in which some of power of the fiber laser light 824 is transferred to a Stokes light, resulting in power instability of the fiber laser light 824. The backward SRS can also be generated by the reflected light from the cladding power stripper 823, the endcap 821, or the workpiece in the all-fiber laser oscillator 800. Therefore, high SRS suppression is needed for stable operation of the all-fiber laser oscillator 800. One way to suppress SRS is to adopt the bidirectional-pump. By increasing ratio of a backward pump power to a forward pump power, a same output power can be used even in laser processing of highly reflective materials without suffering power instability of the fiber laser light 824. This means that the bidirectional-pump using two side-pump signal-and-pump combiners can effectively suppress SRS and prevent back reflected power from launching into the pump laser diodes and damaging thereof with improved thermal performance and reliability. As will be depicted later in FIGS. 5~8 that a backward coupling barrier in both the first side-pump signal-and-pump combiner 805 and the second side-pump signal-and-pump combiner 810 are configured to prevent a third part of the fiber laser light reflected from the workpiece and trapped in the second length of double-clad fiber from coupling back into the four or more multimode fibers of both the first side-pump signal-and-pump combiner 805 and the second side-pump signal-and-pump combiner 810, thereby protecting the first set of the plurality of diode lasers 801 and the second set of the plurality of diode lasers 811 from damage. On the other hand, the conventional pump combiner made by the TFB based on the end-pump technology mentioned earlier is apparently not appropriate to be used in the high power applications because it cannot provide sufficient backward pump isolation and backward signal isolation to protect diode lasers from damaging. An experimental result shows that a backward pump isolation and a backward signal isolation of the conventional pump combiner based on the end-pump technology is 7 dB less than those of the side-pump signal-and-pump combiner.

Figure 4:
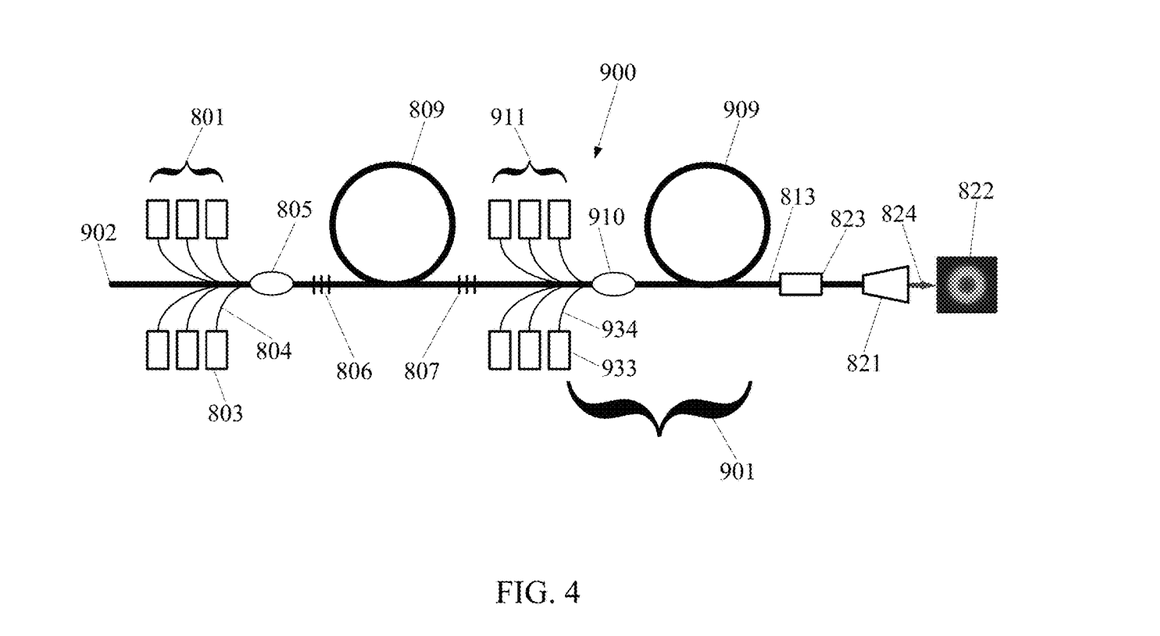
FIG. 4 is a fourth configuration of an all-fiber laser oscillator according to the present disclosure.

FIG. 4 is a fourth configuration of an all-fiber laser oscillator according to the present disclosure. In FIG. 4, an all-fiber laser oscillator 900 comprises the laser cavity comprising the HR FBG 806 and the OC FBG 807. The all-fiber laser oscillator 900 further comprises the amplification optical fiber comprising the first length of double-clad fiber 809 doped with Yb. The first length of double-clad fiber 809 doped with Yb is configured to couple between the HR FBG 806 and the OC FBG 807 and to produce a fiber laser light via the laser cavity. The all-fiber laser oscillator 900 further comprises the plurality of diode lasers 801 each comprising a laser source and a section of pump feeding fiber and configured to provide a portion of a combined optical energy for pumping the first length of double-clad fiber 809 doped with Yb. For example, a diode laser comprises the laser source 803 and the section of pump feeding fiber 804. The all-fiber laser oscillator 900 further comprises a power amplifier section 901 comprising a third length of double-clad fiber 909 doped with Yb and a third side-pump signal-and-pump combiner 910 coupled in series with the third length of double-clad fiber 909 doped with Yb. The all-fiber laser oscillator 900 further comprises a third set of plurality of diode lasers 911 each comprising a laser source and a section of pump feeding fiber and configured to provide a portion of a combined optical energy for pumping the third length of double-clad fiber 909 doped with Yb. For example, a diode laser comprises a laser source 933 and a section of pump feeding fiber 934. The third side-pump signal-and-pump combiner 910 is coupled with the OC FBG 807 and configured to provide a third forward-pump in a master-oscillator power-amplifier (MOPA) scheme, arrangement or configuration. The all-fiber laser oscillator 900 further comprises a modulation input 902. The third length of double-clad fiber 909 doped with Yb is coupled with the endcap 821. The power amplifier section 901 is configured to amplify the fiber laser light generated in a master oscillator upstream. As will be depicted later in FIGS. 5~8 that a backward coupling barrier in the third side-pump signal-and-pump combiner 910 is configured to prevent a fourth part of the fiber laser light reflected from the workpiece and trapped in the second length of double-clad fiber from coupling back into the four or more multimode fibers of the third side-pump signal-and-pump combiner 910, thereby protecting the third set of the plurality of diode lasers 911 from damage. The all-fiber laser oscillator 900 may further comprise the cladding power stripper 823 configured to remove any residual power trapped in a cladding of the delivery fiber 813 and to maintain beam quality of the fiber laser light 824.

Figure 5:
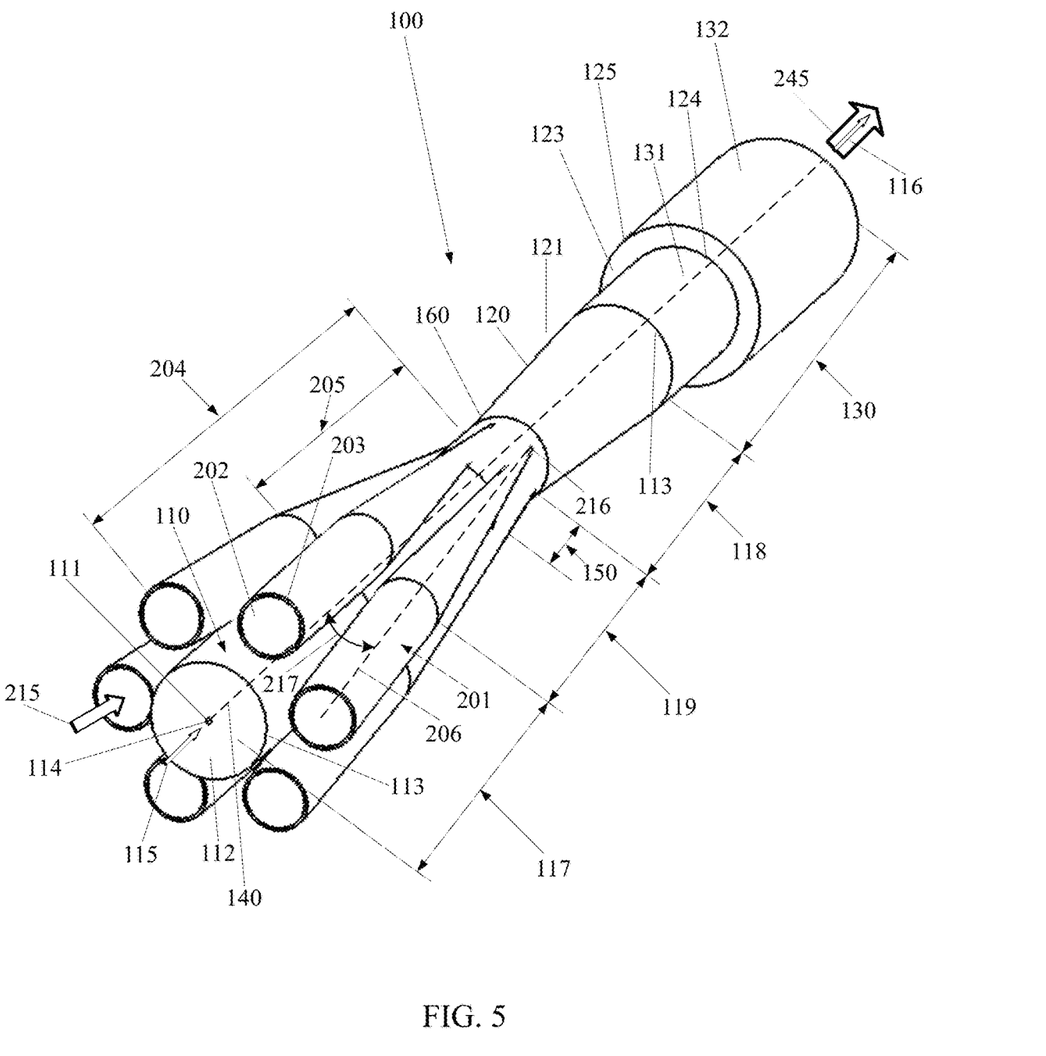
FIG. 5 is a perspective view of a side-pump signal-and-pump combiner according to the present disclosure.
Figure 6:
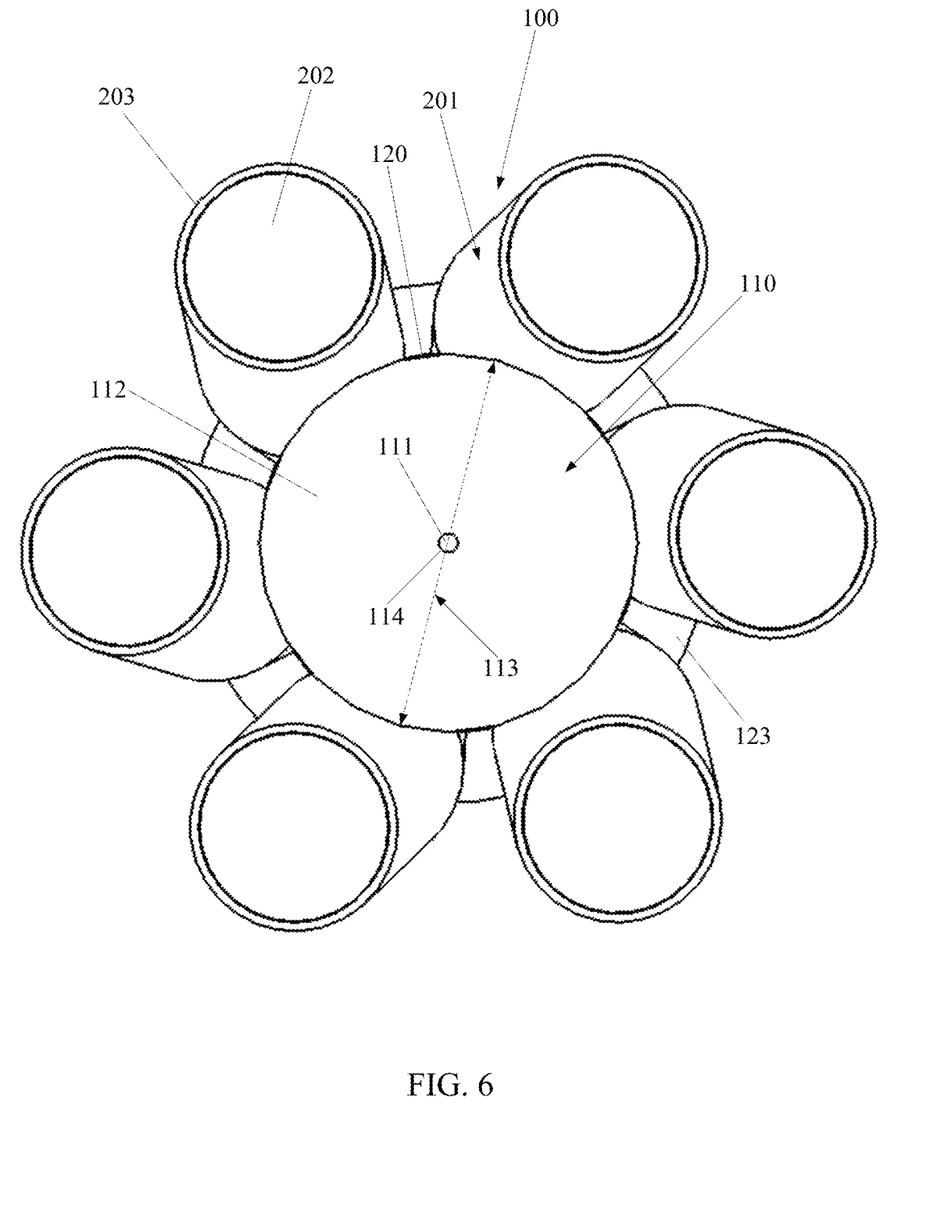
FIG. 6 is a front view of a side-pump signal-and-pump combiner according to the present disclosure.

FIG. 5 is a perspective view of a side-pump signal-and-pump combiner according to the present disclosure. FIG. 6 is a front view of a side-pump signal-and-pump combiner according to the present disclosure. Referring to FIG. 5 and FIG. 6, a side-pump signal-and-pump combiner 100 comprises a second length of double-clad fiber 110 and a plurality of multimode fibers 201 comprising six multimode fibers. So, the side-pump signal-and-pump combiner 100 is a (6+1)×1 signal-and-pump combiner. The second length of double-clad fiber 110 comprises a first core 111, a first cladding 112 with a first diameter 113, a second cladding 123, and an outer polymer coating 125 over the second cladding 123 and is configured to transmit an optical signal in the first core 111 and bounded in a first interface 114 between the first core 111 and the first cladding 112. The optical signal propagates in a forward direction from an input 115 to an output 116 of the second length of double-clad fiber 110. The second length of double-clad fiber 110 further comprises a cladding-stripped portion with both the second cladding 123 and the outer polymer coating 125 stripped. The cladding-stripped portion comprises a first portion 117 in proximity to the input 115, a first taper portion 118, and a coupling portion 119 coupling between the first portion 117 and the first taper portion 118. The first taper portion 118 comprises cross sections with their diameters progressively reduced from the first diameter 113 to a first small taper end in a backward direction. The coupling portion 119 comprises a power transfer region 150.

Referring to FIG. 5 and FIG. 6, each of the plurality of multimode fibers 201 comprises a second core 202, a third cladding 203, outer claddings and buffer coatings (not shown) over the third cladding 203, and a second portion 204 with the outer claddings and buffer coatings stripped. A part of the second portion 204 is configured to be heated and stretched into a second taper in a second taper portion 205 with a first predetermined taper slope with respect to an optical axis 206, for example, of each of the plurality of multimode fibers 201. The second taper in the second taper portion 205 is configured to be fused around the coupling portion 119 with a second small taper end in the power transfer region 150. The plurality of multimode fibers 201 are configured to carry a portion of a combined optical energy and to couple thereof to the second length of double-clad fiber 110, continuing to be guided in the first cladding 112 and bounded in a second interface 120 between the first cladding 112 and the air 121 in the first taper portion 118. The portion of the combined optical energy comes from the multiple diode laser pumps with multiple optical fiber pigtails. In the present disclosure, the combined optical energy is used to represent all the pump energy whereas each of the first side-pump signal-and-pump combiner 805 and the second side-pump signal-and-pump combiner 810 provides a portion of the combined optical energy. In FIG. 6, a part of the combined optical energy is inputted from a pump input 215. The first predetermined taper slope has a negative sign in a forward direction from the pump input 215 to the second small taper end of the second taper portion 205, meaning that the second taper portion 205 has cross sections with their diameters progressively reduced in the forward direction from a diameter of the third cladding 203 to the second small taper end. The portion of the combined optical energy is transferred from the plurality of multimode fibers 201 to the second length of double-clad fiber 110 via the power transfer region 150.

In FIG. 5, the second length of double-clad fiber 110 further comprises a third portion 130 comprising an intermediate section 131 with both the second cladding 123 and the outer polymer coating 125 stripped and an output section 132 in proximity to the output 116. The third portion 130 is configured to connect the intermediate section 131 to the first taper portion 118 and to output both the optical signal and the portion of the combined optical energy coupled. The intermediate section 131 may be omitted. In that case, the third portion 130 is configured to couple the output section 132 to the first taper portion 118 and to output both the optical signal and the portion of the combined optical energy coupled. The portion of the combined optical energy coupled is guided in the first cladding 112 and bounded by a third interface 124 between the first cladding 112 and the second cladding 123 in the output section 132 if the larger divergence of the higher-order modes of the portion of the combined optical energy coupled in the output section 132 is less than the second maximum acceptance angle determined by a second numerical aperture further dictated by refractive indices of the first cladding 112 and the second cladding 123. The output 116 of the second length of double-clad fiber 110, which is an output of the optical signal, is an output 245 of the portion of the combined optical energy coupled.

Referring to FIG. 5 and FIG. 6, the portion of the combined optical energy is coupled into the plurality of multimode fibers 201 each at an incident angle against the optical axis 206 of an associated multimode fiber less than the first maximum acceptance angle determined by the first NA of each of the plurality of multimode fibers 201. The portion of the combined optical energy incident slightly less than the first maximum acceptance angle is reflected in the second taper portion 205 with a divergence angle against the optical axis 206 of the associated multimode fiber larger than the incident angle with higher-order modes generated. The higher-order modes lead to larger divergence. Without properly being taken care of, the larger divergence could result in a power loss, creating localized hot spots in the output section 132 and causing burning damages. On the other hand, the first taper portion 118 in the second length of double-clad fiber 110 is configured to reduce the larger divergence of the higher-order modes, thereby preserving some of the higher-order modes bounded in the second interface 120 to be continuously bounded in the third interface 124 and increasing a coupling efficiency of the combined optical energy coupled from the plurality of multimode fibers 201 to the second length of double-clad fiber 110.

Referring to FIG. 5 and FIG. 6, the first taper portion 118 comprises a second predetermined taper slope configured to partially compensate the larger divergence of the higher-order modes in the second taper portion 205 and to minimize a number of the higher-order modes to launch in the third portion 130 and to leak from the third interface 124, resulting in an energy loss, creating localized hot spots, causing failures, and reducing power carrying capability of the side-pump signal-and-pump combiner 100. The second predetermined taper slope has an opposite sign to the first predetermined taper slope (i.e., a positive sign) in a forward direction from the signal input 115 to an end of the first taper portion 118, meaning that the first taper portion 118 comprises cross sections with their diameters progressively reduced from the first diameter 113 to a predetermined diameter in a backward direction, as mentioned. The power transfer region 150 is configured for the combined optical energy to transfer power from the plurality of multimode fibers 201 to the second length of double-clad fiber 110. The first taper portion 118 further comprises a first small taper end in close proximity to the power transfer region 150, whereas each of the plurality of second taper portions 205 further comprises a second small taper end. A combination of the first small taper end and overall one or more second small taper ends fused around the coupling portion 119 comprises a waist portion 160 in the power transfer region 150 with a cross-sectional diameter smaller than the first diameter 113.

The cladding-stripped portion is installed in a central position before the plurality of second taper portions 205 surrounded are further heated, stretched, and rotated all together in multiple processes. Each process comprises a heated temperature range, heated positions, fiber pulling tensions of each of the plurality of second taper portions 205, a rotation angle increment, and correction measures if the fiber pulling tensions do not reach predetermined ones. The plurality of second taper portions 205 are interlaced with each other and wrapped around the coupling portion 119 with an inclined angle 217 subtended between an optical axis 140 of the second length of double-clad fiber 110 and the optical axis 206 of the plurality of multimode fibers 201 after the multiple processes are carried out, whereas the third portion 130 of the second length of double-clad fiber 110 is exerted with little stress during the multiple processes, thereby preserving an acceptable degradation and an acceptable insertion loss of the optical signal and beam quality of the combined optical energy coupled into the second length of double-clad fiber 110. Heating and rotating the plurality of second taper portions 205 around the second length of double-clad fiber 110 in the multiple processes makes the plurality of second taper portions 205 to approach and eventually touch a circumferential side of the second length of double-clad fiber 110 whereas the third portion 130 is not rotated and exerted with little stress during the multiple processes, thereby preserving an acceptable degradation and an acceptable insertion loss of the optical signal and beam quality of the combined optical energy coupled in the second length of double-clad fiber 110. The multiple processes further comprise a torch scanning process configured to control the fiber pulling tensions of each of the plurality of multimode fibers 201 at the heated positions in the coupling portion 119 and to regulate the rotation angle increment.

Referring to FIG. 5 and FIG. 6, the plurality of second taper portions 205 interlaced are further heated, stretched, and finally fused and becoming embedded in the coupling portion 119, thereby enhancing the coupling efficiency of the combined optical energy, introducing little strain to the second length of double-clad fiber 110, and further preserving the acceptable insertion loss and beam quality of the optical signal in the second length of double-clad fiber 110. The plurality of second taper portions 205 fused and embedded in the second length of double-clad fiber 110 are further heated to remove an unwanted output part of each of the plurality of second taper portions 205. The plurality of second taper portions 205 with the unwanted output part removed are further heated to liquefy material in each break region 216 caused when the unwanted output part of each of the plurality of second taper portions 205 is removed. Each break region 216 becomes a rounded surface converged toward the second length of double-clad fiber 110, thereby further improving the coupling efficiency of the combined optical energy coupled from the plurality of multimode fibers 201 to the second length of double-clad fiber 110.

In view of above, a method of producing the side-pump signal-and-pump combiner 100 may comprise: (a) installing the plurality of multimode fibers 201 stripped of outer claddings and buffer coatings in a jig; (b) heating and stretching the plurality of multimode fibers 201 stripped of outer claddings and buffer coatings to form plurality of second taper portions 205, each of the plurality of second taper portions 205 comprising a first predetermined taper slope with respect to an optical axis of each of the plurality of multimode fibers 201; (c) inserting a second length of double-clad fiber 110 stripped of an outer polymer coating in a central position of the jig without touching the plurality of second taper portions 205; and (d) heating and rotating the plurality of second taper portions 205 so that each of a small taper end of the plurality of second taper portions 205 is fused and embedded around a circumferential side of the second length of double-clad fiber 110 stripped of the outer polymer coating. The multiple processes further comprise a first heat treatment process configured to heat and stretch the first taper portion 118 to form a first taper in the first taper portion 118. The multiple processes further comprise a second heat treatment process configured to heat and stretch the plurality of second taper portions 205 that are accordingly fused and embedded to an embedded depth in the coupling portion 119, further reducing the larger divergence of the higher-order modes generated in the plurality of second taper portions 205 and thereby further improving the coupling efficiency of the combined optical energy coupled from the plurality of multimode fibers 201 into the second length of double-clad fiber 110. Note that when the plurality of second taper portions 205 are embedded to the embedded depth in the coupling portion 119, an output beam divergence from the second length of double-clad fiber 110 is further reduced, thus increasing coupling efficiency of the combined optical energy coupled from the plurality of multimode fibers 201 to the second length of double-clad fiber 110. In other words, the embedded depth in the coupling portion 119 has an effect to reduce the larger divergence of the higher-order modes generated in the plurality of second taper portions 205 and to increase coupling efficiency of the combined optical energy coupled from the plurality of multimode fibers 201 to the second length of double-clad fiber 110.

The multiple processes may further comprise a third heat treatment process with a double-clad fiber pulling. The double-clad fiber pulling in the coupling portion 119 is configured to lessen a micro-deformation in the first core 111 caused in the multiple processes before the third heat treatment process, thereby further preserving acceptable degradation, an acceptable insertion loss, and beam quality of the optical signal at the output 116 of the second length of double-clad fiber 110. The multiple processes further comprise a fourth heat treatment process configured to control the embedded depth in the coupling portion 119 and to modify launching conditions of the combined optical energy coupled to the second length of double-clad fiber 110, thereby further reducing the larger divergence of the higher-order modes and improving coupling efficiency of the combined optical energy coupled from the plurality of multimode fibers 201 to the second length of double-clad fiber 110. The multiple processes may further comprise optical monitoring processes configured to observe and check the optical signal and the combined optical energy at the output 116 of the second length of double-clad fiber 110.

The side-pump signal-and-pump combiner 100 may be directly spliced to the rare-earth-doped double-clad fiber via the HR FBG 806 (in FIG. 1) to reduce excess optical losses of both the optical signal and the combined optical energy due to mode field diameter mismatch between the side-pump signal-and-pump combiner 100 and the rare-earth-doped double-clad fiber. The side-pump signal-and-pump combiner 100 may further comprise one or more laser diode pigtails spliced to connect to each pump input 215 of the plurality of multimode fibers 201 and configured to launch a part of the combined optical energy to the plurality of multimode fibers 201. The side-pump signal-and-pump combiner 100 may further comprise one or more fiber lasers connected to each pump input 215 of the plurality of multimode fibers 201 and configured to launch a part of the combined optical energy to the plurality of multimode fibers 201 in very high power applications. The plurality of multimode fibers 201 may comprise four or more multimode fibers.

Figure 7:
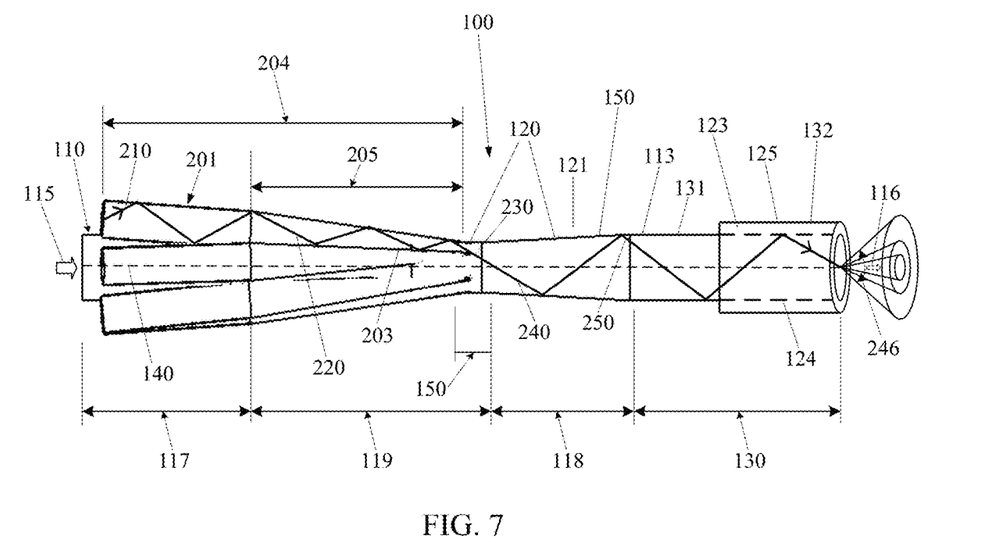
FIG. 7 is an example of a pump light launched and reflected in a side-pump signal-and-pump combiner according to the present disclosure.

FIG. 7 is an example of a pump light launched and reflected in a side-pump signal-and-pump combiner according to the present disclosure. In FIG. 7, a right view of the side-pump signal-and-pump combiner 100 is depicted with an example sketch of the pump light launched and reflected in the side-pump signal-and-pump combiner 100. Note that the third cladding 203 of each of the plurality of multimode fibers 201 is present although not visible in FIG. 7. It also means that each of the plurality of multimode fibers 201 is not coreless, and there is no intermediate fiber used. Referring to FIG. 5 and FIG. 7, each of the plurality of second taper portions 205 is fused around the coupling portion 119 at the inclined angle 217. Shown here is an example of a meridional ray which passes through the optical axis 206 (in FIG. 5) of each of the plurality of multimode fibers 201 and obeys a self-interference condition. In other words, the meridional ray intersects the optical axis 206 at each internal reflection. In FIG. 7, a light ray 210 is incident slightly less than the first maximum acceptance angle determined by the first NA of each of the plurality of multimode fibers 201. When the light ray 210 passes through each of the plurality of second taper portions 205, the higher-order modes are generated because a divergence angle against the optical axis 206 increases for each internal reflection. In other words, the higher-order modes generated lead to larger divergence. The higher-order modes with a first light ray 220 launch into the coupling portion 119. The divergence angle of the first light ray 220 becomes larger and larger in each of the plurality of second taper portions 205 after more internal reflections. Note that a pump power transferred in a power transfer process involves an initial adiabatic transfer of the power in the second core 202 to an interface between the third cladding 203 and the air 121. The pump power is then transferred to adjacent cladding modes bounded by the second interface 120 between the first cladding 112 and the air 121 in the first taper portion 118 and the intermediate section 131 (see also FIG. 5) and finally bounded by the third interface 124 between the first cladding 112 and the second cladding 123 in the output section 132. Each of the plurality of multimode fibers 201 comprises an NA of 0.22 (i.e., 0.22-NA). In other words, the plurality of second taper portions 205 are configured to increase beam divergence of the higher-order modes so that the pump power can be transferred to adjacent cladding modes bounded by the second interface 120 between the first cladding 112 and the air 121. Without the first taper portion 118, the larger divergence of the higher-order modes will be maintained throughout the third portion 130 according to a principle of total internal reflection in an optical fiber. The second length of double-clad fiber 110 according to the present disclosure comprises an NA of 0.46 (i.e., 0.46-NA). For those higher-order modes not guided by the 0.46-NA, the portion of the combined optical energy will leak out from the third interface 124 between the first cladding 112 and the second cladding 123 into the outer polymer coating 125, converting into a heat to accumulate in the output section 132, resulting in premature failures or burning damages.

In FIG. 7, when the larger divergence of the higher-order modes exceeds the first maximum acceptance angle determined by the first NA of each of the plurality of multimode fibers 201, the first light ray 220 becomes a second light ray 230 ending up with a first cladding mode of the plurality of multimode fibers 201. The plurality of second taper portions 205 are fused to the first cladding 112 of the second length of double-clad fiber 110. Because a refractive index of the first cladding 112 is larger than that of the second core 202 of the plurality of multimode fibers 201, the first cladding mode is coupled into the second length of double-clad fiber 110 in the power transfer region 150 and further bounded by the second interface 120, all the way to complete the power transfer process in the coupling portion 119. For those light rays with the larger divergence of the higher-order modes not satisfying the second maximum acceptance angle determined by the second NA of the second length of double-clad fiber 110, the portion of the combined optical energy coupled leaks to the air 121. For a third light ray 240 with the larger divergence of the higher-order modes satisfying the second maximum acceptance angle of the second length of double-clad fiber 110 in the first taper portion 118, the portion of the combined optical energy coupled is guided in the second interface 120 in the first taper portion 118. The first taper portion 118 is therefore configured to decrease the larger divergence of the higher-order modes such as the third light ray 240. As shown, the larger divergence of the higher-order modes becomes smaller and smaller in the first taper portion 118, ending up with a fourth light ray 250 at an end of the first taper portion 118 continuing in the intermediate section 131. The fourth light ray 250 with a smaller divergence travels all the way to the output 116 of the second length of double-clad fiber 110. As mentioned, the output 116 of the second length of double-clad fiber 110, which is the output of the optical signal, is also the output 245 of the pump light coupled. As shown, the pump light coupled is outputted with a beam divergence 246. A half-angle of the beam divergence 246 is less than a divergence angle of the second light ray 230. Not all light rays can be effectively coupled into the second length of double-clad fiber 110 and transmitted thereof, especially when the first taper portion 118 is not in place. In that case, the second light ray 230 is directly coupled into the third portion 130 with the larger divergence of the higher-order modes, which may exceed the maximum acceptance angle determined by the second NA of the second length of double-clad fiber 110, further dictated by refractive indices of the first cladding 112 and the second cladding 123 of the second length of double-clad fiber 110. Parts of the second light ray 230 that exceeds the second maximum acceptance angle will leak from the second cladding 123 into the outer polymer coating 125 and is converted into a heat to accumulate in the output section 132. The heat will cause a dramatic temperature rise on the outer polymer coating 125 and finally cause irreversible burning damages if the portion of the combined optical energy coupled is high enough. The heat will also limit the side-pump signal-and-pump combiner 100 to withstand a high power. The first taper portion 118 comprises the second predetermined taper slope configured to partially compensate the larger divergence of the higher-order modes in each of the plurality of second taper portions 205 and to minimize numbers of the higher-order modes to launch in the third portion 130 and to leak from the third interface 124, thus reducing energy losses and a number of localized hot spots in the output section 132. The localized hot spots in the outer polymer coating 125 cause reliability problems and possible failures and further reduce power carrying capability of the side-pump signal-and-pump combiner 100. In other words, with the first taper portion 118 in place, the larger divergence of the higher-order modes generated in the plurality of second taper portions 205 can be compensated with some of the higher-order modes originally not supported by the 0.46-NA guided in the second length of double-clad fiber 110 without leaking out to the outer polymer coating 125.

The side-pump signal-and-pump combiner 100 has inherently a higher backward pump isolation and a higher backward signal isolation than an end-pump pump combiner does. As mentioned earlier, each of the plurality of multimode fibers 201 is tapered in the second taper portion 205 with the third cladding 203 present. The second taper portion 205 is wrapped around the first cladding 112 of the second length of double-clad fiber 110 whereas the third cladding 203 directly contacts the first cladding 112. The first cladding 112 comprises a second refractive index configured to be larger than the first refractive index of the third cladding 203, thereby forming a backward coupling barrier for all reflected in the forward direction and a backward direction. The all reflected comprises a part of the combined optical energy, a part of the input optical signal, and a part of the fiber laser light all with a small propagation angle. That is, the all reflected in the forward direction and the backward direction, when reaching out the coupling portion 119, are continuously bounded in a third interface between the first cladding 112 and the third cladding 203, thereby significantly suppressing the part of the combined optical energy, the part of the input optical signal, and the part of the fiber laser light from coupling back into both the plurality of multimode fibers 110 and the plurality of the section of pump feeding fibers 804, thereby increasing the backward pump isolation and the backward signal isolation.

Figure 8:
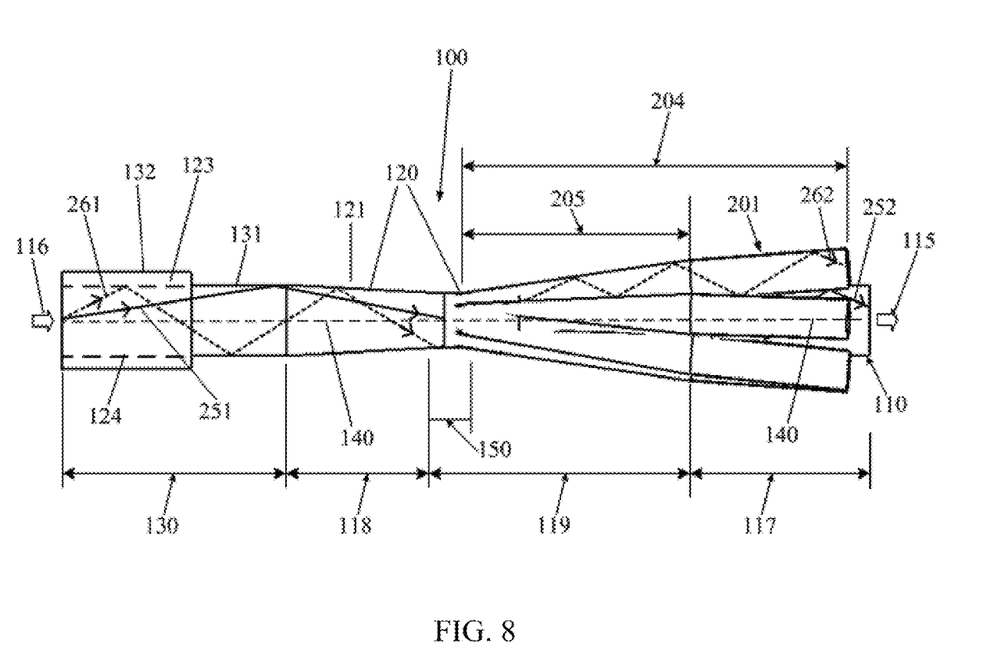
FIG. 8 is an example of an optical energy suppressed in a side-pump signal-and-pump combiner according to the present disclosure.

FIG. 8 is an example of an optical energy in the all-fiber laser oscillator suppressed in a side-pump signal-and-pump combiner according to the present disclosure. Referring to FIG. 3, a part of residual pump light can launch the second side-pump signal-and-pump combiner 810 from the first side-pump signal-and-pump combiner 805. A part of an optical signal and a part of the fiber laser light can leak into the second side-pump signal-and-pump combiner 810 and couple into the second set of the plurality of laser diodes 811 possibly damaging thereof, depending on how high the backward pump isolation and the backward signal isolation provided by the second side-pump signal-and-pump combiner 810. Similarly, the back reflected laser light from the optics downstream, the endcap 821, and the workpiece and a part of the fiber laser light can be launched into the first side-pump signal-and-pump combiner 805. The optical energy can leak into the first side-pump signal-and-pump combiner 805 and couple into the first set of the plurality of laser diodes 801 possibly damaging thereof, depending on how high the backward pump isolation and the backward signal isolation provided by the first side-pump signal-and-pump combiner 805. In FIG. 8, a fifth light ray 251 with low-order modes from the "input" 116 (i.e., the output in FIG. 7) is launched into the second length of double-clad fiber 110. According to an experiment result, the side-pump signal-and-pump combiner can completely suppress the low-order modes from coupling into each of the plurality of multimode fibers 201. Therefore, a sixth light ray 252 comes out from the second length of double-clad fiber 110 with most of the optical energy outputted to the "output" 115 (i.e., the input in FIG. 7). However, a seventh light ray 261 representing higher-order modes can partially couple into each of the plurality of multimode fibers 201. As mentioned, the first cladding 112 comprises the second refractive index larger than the first refractive index of the third cladding 203, thereby forming a backward coupling barrier to prevent most of the optical energy reflected in the second length of double-clad fiber 110 from coupling into each of the plurality of multimode fibers 201. That is, most of the optical energy reflected in the forward direction and the backward direction, when reaching out the coupling portion 119, is continuously bounded in a third interface between the first cladding 112 and the third cladding 203, thereby significantly suppressing the most of the optical energy from coupling back into both the plurality of multimode fibers 201 and the plurality of the section of pump feeding fibers 804, thereby increasing the backward pump isolation and the backward signal isolation and preventing the plurality of the laser diodes from damage. In FIG. 5, an eighth light ray 262 comes out the plurality of multimode fibers 201 with the optical energy significantly suppressed.

Although depicted in FIGS. 1~8 as six multimode fibers, the plurality of multimode fibers 201 may comprise any integer numbers of multimode fibers, regardless of what are mentioned in literatures as extremely difficult to make, increasing insertion loss, and decreasing pump coupling efficiency for configurations with four or more multimode fibers. In contrast to all the reported side-pump structure, the first taper portion 118 is adopted with associated multiple processes in making the side-pump signal-and-pump combiner 100 according to the present disclosure. In experiments, six 200 µm-core/220 µm-cladding with 0.22-NA multimode fibers each with a pump power of 200 W are used with the second length of double-clad fiber of 20 µm-core/400 µm-cladding with 0.46-NA to build the side-pump signal-and-pump combiner 100. Experimental results show that such a (6+1)×1 side-pump signal-and-pump combiner can achieve an output beam divergence improvement of 10% when measured at the output of the side-pump signal-and-pump combiner 100, a coupling efficiency of 98%, and a beam quality (i.e., $M^2$ factor) of 1.3 with a high production yield while maintaining an insertion loss of 0.1 dB for the optical signal, outperforming the cascade-pumping configuration, in which a plurality of the side-couplers and the end-pump signal-and-pump combiners must be used to provide an enough pump power but to suffer an incremental splicing loss in addition to the insertion loss. Due to such an output beam divergence improvement, a thermal performance is improved by at least 60%, thus enhancing reliability and power carrying capability of the (6+1)×1 side-pump signal-and-pump combiner 100. Although the (6+1)×1 side-pump signal-and-pump combiner 100 is used in above experiment, the plurality of multimode fibers may comprise eight or more multimode fibers, limited by a jig that mechanically supports the plurality of multimode fibers during production processes. With 2.4 kW input pump power, SRS does not occur due to the bidirectional pumping with a backward pump power 10% larger than a forward pump power. As mentioned, the plurality of multimode fibers 201 may comprise any integer numbers of multimode fibers from two to nine, although depicted in FIGS. 1~8 as six multimode fibers.

Whereas preferred embodiments of the present disclosure have been shown and described, it will be realized that alterations, modifications, and improvements may be made thereto without departing from the scope of the following claims. Another side-pump signal-and-pump combiner using various kinds of combinations of compensation tapers to accomplish the same or different objectives could be easily adapted for use from the present disclosure. Accordingly, the foregoing descriptions and attached drawings are by way of example only and are not intended to be limiting.

What is claimed is:

1. An all-fiber laser oscillator, comprising:
   a laser cavity comprising a high-reflector fiber-Bragg grating (HR FBG) and a low-reflectivity output coupler FBG (OC FBG);
   an amplification optical fiber comprising a first length of double-clad fiber doped with Ytterbium (Yb), the first length of double-clad fiber coupled between the HR FBG and the OC FBG and configured to produce a fiber laser light via the laser cavity;
   a plurality of diode lasers each comprising a laser source and a section of pump feeding fiber and configured to provide a portion of a combined optical energy to pump the first length of double-clad fiber doped with Yb;
   an endcap configured to output the fiber laser light to a workpiece;
   at least one side-pump signal-and-pump combiner coupled with either the HR FBG or the OC FBG and comprising:
   a second length of double-clad fiber comprising a first core, a first cladding with a first diameter, and a second cladding over the first cladding, the second length of double-clad fiber configured to transmit an optical signal in the first core with the optical signal bounded in a first interface between the first core and the first cladding, wherein the second length of double-clad fiber further comprises a cladding-stripped portion with the second cladding stripped, wherein the cladding-stripped portion comprises a first portion, a first taper portion, and a coupling portion coupled between the first portion and the first taper portion, and wherein the first taper portion comprises cross sections with diameters thereof progressively reduced from the first diameter to a predetermined diameter toward the coupling portion; and
   four or more multimode fibers each respectively comprising a second core, a third cladding with a first refractive index, outer claddings and buffer coatings over the third cladding, and a section of multimode fiber with the outer claddings and buffer coatings stripped, wherein a part of the section of multimode fiber is configured to be heated and stretched into a second taper portion with a first predetermined taper slope with respect to an optical axis of the section of multimode fiber, wherein a plurality of second taper portions in the four or more multimode fibers are configured to be fused around the coupling portion with the third cladding directly coupled with the first cladding, wherein each of the four or more multimode fibers is configured to respectively splice with the section of pump feeding fiber and to couple a part of the combined optical energy into the second length of double-clad fiber, and wherein the portion of the combined optical energy continues to be guided in the first cladding and bounded in a second interface between the first cladding and the air around the cladding-stripped portion, wherein:
   the part of the combined optical energy is configured to pass through the second taper portion with an increasing divergence angle against an optical axis of the second taper portion for each internal reflection in the second taper portion, thereby promoting coupling of the part of the combined optical energy into the second length of double-clad fiber;
   the first cladding comprises a second refractive index configured to be larger than the first refractive index, thereby forming a backward coupling barrier to suppress an optical energy in the second length of double-clad fiber from coupling into the four or more multimode fibers, the optical energy comprising the part of the combined optical energy and a part of the optical signal; and
   the optical energy, when propagating in the coupling portion, is continuously bounded in a third interface between the first cladding and the third cladding, thereby being suppressed from coupling back into both the four or more multimode fibers and the plurality of the section of pump feeding fibers, thereby improving a backward pump isolation and a backward signal isolation of the at least one side-pump signal-and-pump combiner.

2. The all-fiber laser oscillator of claim 1, wherein the at least one side-pump signal-and-pump combiner is coupled with the HR FBG and configured to provide a first forward-pump in a co-pump configuration, and wherein the backward coupling barrier in the at least one side-pump signal-and-pump combiner is configured to prevent a first part of the fiber laser light reflected from the workpiece and trapped in the second length of double-clad fiber from coupling back into the four or more multimode fibers, thereby protecting the plurality of diode lasers from damage.

3. The all-fiber laser oscillator of claim 2, further comprising a power amplifier section coupled between the OC FBG and the endcap, wherein the power amplifier section comprises a third length of double-clad fiber doped with Yb and a third side-pump signal-and-pump combiner coupled in series with the third length of double-clad fiber doped with Yb, wherein the third side-pump signal-and-pump combiner is coupled with the OC FBG and configured to provide a third forward-pump in a master-oscillator power-amplifier (MOPA) configuration, wherein the power amplifier section is configured to amplify the fiber laser light generated upstream, and wherein the backward coupling barrier in the third side-pump signal-and-pump combiner is configured to prevent a fourth part of the fiber laser light reflected from the workpiece and trapped in the second length of double-clad fiber from coupling back into the four or more multimode fibers of the third side-pump signal-and-pump combiner, thereby protecting the plurality of diode lasers from damage.

4. The all-fiber laser oscillator of claim 1, wherein the at least one side-pump signal-and-pump combiner is coupled with the OC FBG and configured to provide a first backward-pump in a counter-pump configuration, and wherein the backward coupling barrier in the at least one side-pump signal-and-pump combiner is configured to prevent a second part of the fiber laser light reflected from the workpiece and the HR FBG and trapped in the second length of double-clad fiber from coupling back into the four or more multimode fibers, thereby protecting the plurality of diode lasers from damage.

5. The all-fiber laser oscillator of claim 1, wherein the at least one side-pump signal-and-pump combiner comprises a first side-pump signal-and-pump combiner coupled with the HR FBG and a second side-pump signal-and-pump combiner coupled with the OC FBG, wherein the first side-pump signal-and-pump combiner and a second side-pump signal-and-pump combiner are respectively configured to provide a second forward-pump and a second backward-pump in a bidirectional-pump configuration, and wherein the backward coupling barrier in either the first side-pump signal-and-pump combiner or the second side-pump signal-and-pump combiner is configured to respectively prevent a residual pump light in the second length of double-clad fiber from coupling back into the four or more multimode fibers, thereby protecting the plurality of diode lasers from damage due to the residual pump light respectively from either the second side-pump signal-and-pump combiner or the first side-pump signal-and-pump combiner.

6. The all-fiber laser oscillator of claim 5, wherein the backward coupling barrier in either the first side-pump signal-and-pump combiner or the second side-pump signal-and-pump combiner is further configured to respectively prevent a third part of the fiber laser light reflected from the workpiece and trapped in the second length of double-clad fiber from coupling back into the four or more multimode fibers, thereby protecting the plurality of diode lasers from damage.

7. The all-fiber laser oscillator of claim 1, wherein the second length of double-clad fiber further comprises a third portion comprising an output section, wherein the output section comprises an outer polymer coating over the second cladding, wherein the third portion is configured to couple the output section to the cladding-stripped portion, wherein the output section in the at least one side-pump signal-and-pump combiner is configured to output both the optical signal and the portion of the combined optical energy coupled, and wherein the portion of the combined optical energy coupled is guided in the first cladding and bounded by a fourth interface between the first cladding and the second cladding in the output section.

8. The all-fiber laser oscillator of claim 7, wherein the first taper portion comprises a second predetermined taper slope with an opposite sign to the first predetermined taper slope, the second predetermined taper slope configured to partially compensate the larger divergence of the higher-order modes in the second taper portion and to minimize a number of the higher-order modes to launch in the third portion and to leak from the fourth interface, thereby reducing an energy loss and a number of localized hot spots in the outer polymer coating rendering burning damages, and thereby further increasing power carrying capability and reliability of the at least one side-pump signal-and-pump combiner.

9. The all-fiber laser oscillator of claim 8, wherein an epoxy overlay is configured to apply over the coupling portion, the first taper portion, and the third portion, wherein the epoxy overlay comprises a third refractive index less than the second refractive index, and wherein the epoxy overlay is configured to preserve lower-order modes in both the first taper portion and the third portion and to further minimize a number of the higher-order modes to launch in the third portion and to leak from the fourth interface, thereby further reducing an energy loss and a number of localized hot spots in the outer polymer coating rendering burning damages, and thereby further increasing power carrying capability and reliability of the at least one side-pump signal-and-pump combiner.

10. The all-fiber laser oscillator of claim 9, wherein the coupling portion comprises a power transfer region configured to allow the combined optical energy to transfer power from the four or more multimode fibers to the second length of double-clad fiber, wherein the first taper portion progressively reduces a diameter thereof toward the predetermined diameter to form a waist in proximity to the power transfer region, wherein each of the plurality of second taper portions progressively reduces a diameter thereof toward one end to form a second taper end, and wherein the waist and overall four or more second taper ends in the four or more multimode fibers are fused together to form a waist portion in the power transfer region with a cross-sectional diameter smaller than the first diameter.

* * * * *